US006865729B1

(12) United States Patent
McMillan et al.

(10) Patent No.: US 6,865,729 B1
(45) Date of Patent: Mar. 8, 2005

(54) FLOWCHART-BASED CONTROL SYSTEM INCLUDING AUTOMATIC DOWNTIME AND CYCLE TIME ANALYSIS

(75) Inventors: Andrew H. McMillan, Dearborn, MI (US); Joseph Gasiorek, Ann Arbor, MI (US); Thomas Harkaway, Saline, MI (US)

(73) Assignee: Entivity, Inc., Ann Arbor, MI (US)

( * ) Notice: Subject to any disclaimer, the term of this patent is extended or adjusted under 35 U.S.C. 154(b) by 460 days.

(21) Appl. No.: 09/676,681

(22) Filed: Sep. 29, 2000

(51) Int. Cl.[7] .............................................. G06F 9/44
(52) U.S. Cl. .................... 717/109; 717/113; 717/132
(58) Field of Search .................. 717/106–119, 127–128, 717/131–133, 136–137, 140–141; 715/514–516, 505–508

(56) References Cited

U.S. PATENT DOCUMENTS

| | | | | |
|---|---|---|---|---|
| 5,327,568 A | * | 7/1994 | Maejima et al. ............ | 717/147 |
| 6,243,857 B1 | * | 6/2001 | Logan et al. ............... | 717/111 |

OTHER PUBLICATIONS

Yang Kum Yuen et al., "Assembly Language Software Development System", IEEE, pp.: 138–141, Dec. 1997.*
Crews et al., "The Flowchart Interpreter for Introductory Programming Courses", IEEE, pp.: 307–312, Nov. 1998.*
Sherman et al., "Flowtrace, A Computer program for Flowcharting Programs", ACM, pp.: 845–854, Dec. 1966.*
Kawaguchi et al., "Data Driven Logic: A Programming Method Using Dataflow Diagrams", IEEE, pp.: 46–51, Dec. 1999.*
Reiss, "Graphical Program Development with PECAN Program Development Systems", ACM, pp.: 30–41, Apr. 1984.*

* cited by examiner

Primary Examiner—Antony Nguyen-Ba
Assistant Examiner—Ted T. Vo
(74) Attorney, Agent, or Firm—Harness, Dickey & Pierce, P.L.C.

(57) ABSTRACT

A flowchart-based programming and control system includes a computer with a processor, memory, and display. A device is connected to the computer and is associated with a process. A flowcharting module generates and edits flowchart source code that includes flowchart blocks and that contains logic for operating the device. First and second flowchart blocks assign an operational state of the process. A reason code module associated with the flowcharting module assigns first and second reason codes to the first and second flowchart blocks. The flowchart module compiles the flowchart source code into flowchart object code. A flowchart run-time engine module executes the flowchart object code to control the process. The flowchart object code generates the first and second reason codes during execution of the first and second flowchart blocks. A performance analysis module and a charting module record and graphically represent the operational state of the process over time.

21 Claims, 7 Drawing Sheets

FLOWCHART-BASED CONTROL SYSTEM INCLUDING AUTOMATIC DOWNTIME AND CYCLE TIME ANALYSIS

BACKGROUND AND SUMMARY OF THE INVENTION

The present invention relates to programming and control systems. More particularly, this invention relates to flowchart-based programming and control systems that automatically capture operational modes of a process for downtime and cycle time analysis.

Programming and control systems are generally used for controlling processes that involve devices such as relays, solenoids, motors, valves, switches, and other electrical and electromechanical devices. The processes that are controlled include machining, drilling, welding, spraying paint, mixing materials, assembling parts, handling materials, etc.

Conventional programming and control systems generally employed ladder diagrams and relay ladder logic (RLL) to control the operation of the devices associated with the processes. In practice, however, programmers tend to use a flowchart to initially define the operation of the devices in the process. Then, the programmers manually translated the flowchart into the ladder diagrams. The programmers employ the flowcharts as a first step because the flowcharts emulate human thought processes whereas the ladder diagrams do not. Recognizing that the translation of flowcharts to RLL was an unneeded step, developers created programming and control systems that automatically convert flowcharts to RLL. Subsequently, developers created programming and control systems that control the process directly from the flowchart logic. One flowchart-based system is disclosed in "Continuous Flowchart, Improved Data Format and Debugging System For Programming and Operation of Machines", U.S. Pat. No. 4,852,047, which is hereby incorporated by reference.

Flowcharts generally include action blocks which represent an operation or action based on current input and output data. Action blocks generally have one entry point which is usually located at the top and one exit point that is usually located at the bottom. A branching or decision block is a diamond-shaped block which represents a branch in the control path based on the results of a decision. Branching blocks generally have one entry point that is usually located at the top and two exit points that are usually located at the side and the bottom. Using combinations of the action and branching blocks, a programmer creates a flowchart that controls one or more devices that are associated with a process.

As a process is operated, the controller moves through the flowchart action and decision blocks. The location of the block within the flowchart provides information concerning the operational status of the process. While conventional flowchart systems typically display the current location of control within the flowchart, these systems generally do not track the operational status of the process over time.

Process engineers, production supervisors and plant managers are responsible for maximizing the output of the process. In order to make informed decisions, the managers, supervisors and engineers need information identifying the reasons for process downtime as well as the cycle time of each step of the process to maximize throughput. In the past, the managers, supervisors and engineers needed to develop special logic for capturing downtime reasons and cycle times of the process.

A flowchart-based programming and control system includes a computer with a processor, memory, and display. A device is connected to the computer and is associated with a process. A flowcharting module run by the computer generates and edits flowchart source code that includes flowchart blocks and that contains logic for operating the device to further the process. First and second flowchart blocks change an operational state of the process. A reason code module associated with the flowcharting module assigns reason codes to the status of the process using a special type of action or decision block. The flowchart module compiles the flowchart source code into flowchart object code. A flowchart run-time engine module associated with the computer executes the flowchart object code to control the process. The flowchart object code generates the reason codes during execution of the associated flowchart blocks in the flowchart object code. A performance analysis module and a charting module record and graphically represent the operational state of the process over time.

DETAILED DESCRIPTION OF THE PREFERRED EMBODIMENTS

The ensuing detailed description provides preferred exemplary embodiments only and is not intended to limit the scope, applicability or configuration of the present invention. Rather, the ensuing detailed description of the preferred exemplary embodiments will provide those skilled in the art with an enabling description for implementing the preferred exemplary embodiments of the present invention. It being understood that various changes may be made in the function and arrangement of the elements without departing from the spirit and scope of the invention as set forth in the appended claims.

Figure 1:
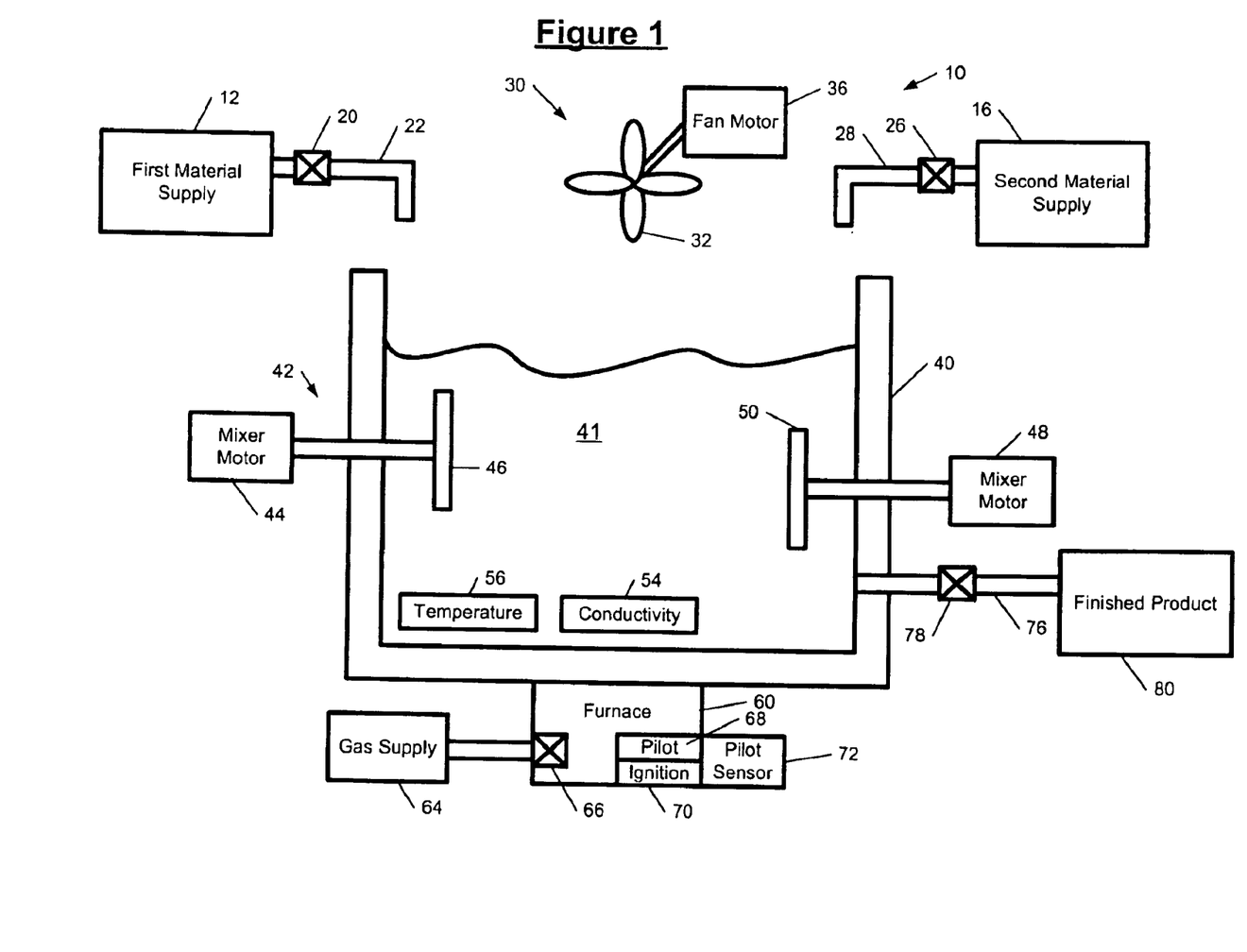
FIG. 1 is a functional block diagram of an exemplary process for illustrating the present invention.

Referring now to FIG. 1, an exemplary process 10 will be employed to illustrate the invention. The process 10 heats and mixes two materials until their conductivity reaches a pre-selected conductivity. Then, the process delivers the materials to a holding tank. The process 10 includes a supply 12 for a first material and a supply 16 for a second material. A solenoid valve 20 is positioned in line with a conduit 22 to control the delivery of the first material. A second solenoid valve 26 is positioned in line with a conduit 28 to control the delivery of the second material. The solenoid valves 20 and 26 are operated electronically. A fan 30 includes fan blades 32 and a fan motor 36.

A material container 40 contains the first and second materials that have been delivered by the first and second supplies 12 and 16. A mixer 42 includes a mixer motor 44 and a mixing device 46 that is located inside the container 40. A second mixer 46 includes a mixer motor 48 and a mixing device 50 that is also located inside the container 40 on an opposite side of the container. A conductivity sensor 54 is located inside the container 40 in fluid contact with the first and second materials. A temperature sensor 56 is likewise located inside the container 40 in fluid contact with the first and second materials.

A furnace 60 is positioned adjacent to the container 40 and is connected to a gas supply 64. The furnace 60 heats the first and second materials. The furnace 60 includes a solenoid valve 66 for supplying gas to the furnace 60. The furnace 60 includes a pilot 68 and an ignition device 70 which lights the pilot when triggered by an electronic signal. A pilot sensor 72 generates a signal indicating whether a pilot flame is present or absent. A conduit 76 is connected to the container 40 and a finished product container 80. A solenoid valve 78 controls movement of fluid between the containers 40 and 80. After mixing and heating the two materials, a finished product is delivered to the finished product container 80 by actuating the solenoid valve 78.

Figure 2:
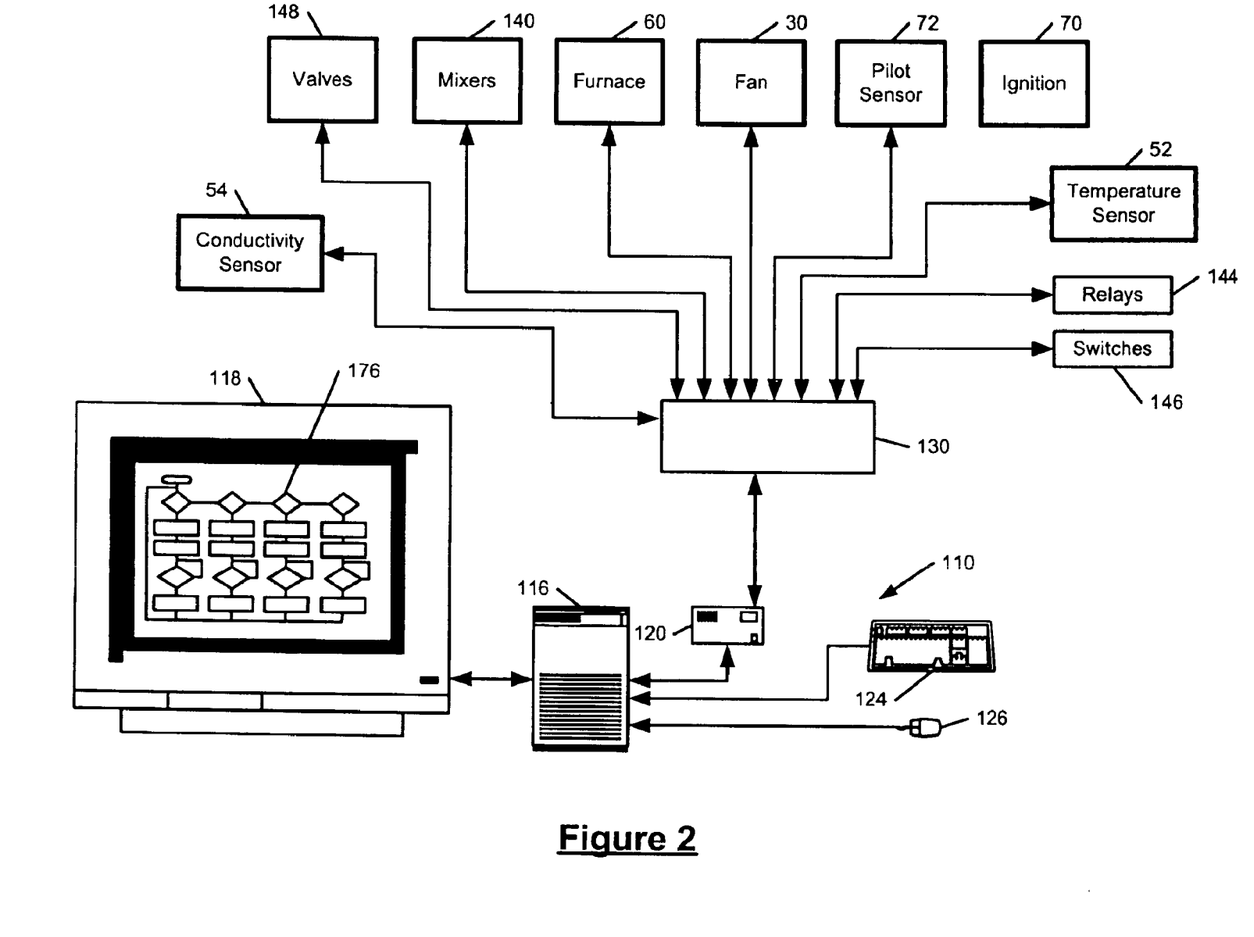
FIG. 2 is a functional block diagram of a flowchart-based programming and control system according to the invention.

Referring now to FIG. 2, a flowchart-based programming and control system is illustrated at 110. The programming and control system 110 includes a computer 116, a display 118, an input/output card (I/O) 120 and one or more I/O devices such as a keyboard 124 and/or a mouse 126. The I/O card 120 is connected to a communications network 130. The I/O card 120 can be an Ethernet card and the communications network 130 can be an Ethernet network. Skilled artisans can appreciate that other I/O cards and communications networks can be employed without departing from the spirit of the invention. The communications network 130 is connected to the mixers 42 and 46 (both of which are identified at 140 in FIG. 2). The communications network 130 is similarly connected to the fan 30, the pilot sensor 72, the ignition device 70, the temperature sensor 52, the conductivity sensor 54, one or more relays 144, one or more switches 146, and valves 20, 26 and 66 (collectively identified at 148).

Figure 3A:
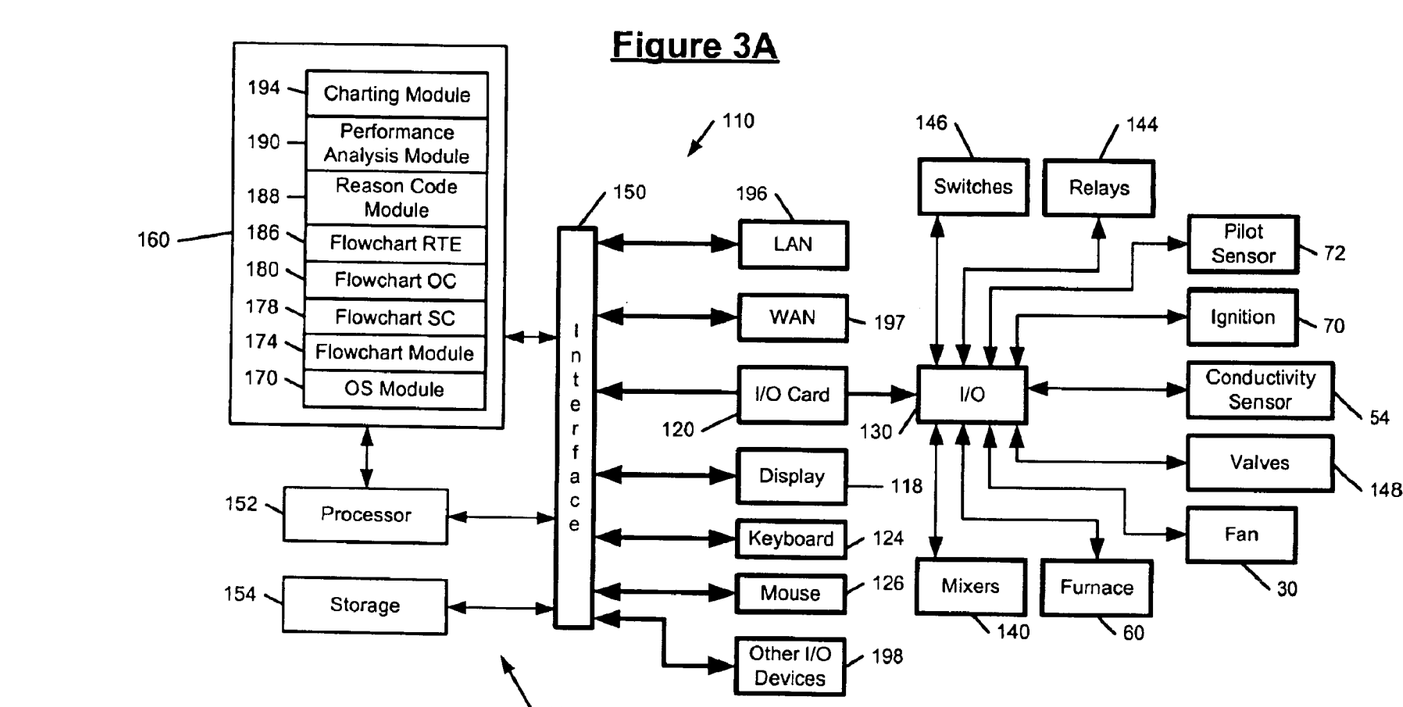
FIG. 3A is a more detailed functional block diagram of the flowchart-based programming and control system of FIG. 2.

Referring now to FIG. 3A, the flowchart-based programming and control system 110 is illustrated in further detail. The computer 116 includes an I/O interface 150 that is connected to a processor 152 and memory storage 154 which can include floppy drives, hard drives, optical storage, etc. Memory 160 is connected to the processor 152 and the I/O interface 150. The memory 160 includes random access memory (RAM) and read only memory (ROM). When the computer 116 is booted up, the computer 116 loads an operating system (OS) module 170 which is preferably a multi-tasking OS, such as Windows 2000®, Windows NT® and Windows NTE®. After being selected and launched by the user, the computer 116 loads a flowchart module 174 into memory 160. As a user creates a flowchart 176, the flowchart module 174 generates flowchart source code 178 which can be stored in memory 160 or memory 154. When the user validates and debugs the flowchart source code 178, the user compiles the flowchart source code 178 and generates flowchart object code 180 that is executed by a flowchart run time engine 186 during operation of the process 10.

A reason code module 188 which may be an individual module or integrated with other modules such as the flowchart module 174 allows a user to assign reason codes to the status of the process described by one or more action or decision blocks. In a preferred embodiment, the reason code module 188 assigns reason codes to action blocks. The reason code module 188 may also allow a user to assign sub-reason codes to the status of the process using action and/or decision blocks. A performance analysis module 190, which may be an individual module or associated with other modules such as the flowchart runtime engine 186, records the generation of reason codes during execution of the flowchart object code 180. A charting module 194 which may be an individual module or a form part of another module such as the performance analysis module 190 provides a graphical representation of operational data, that summarizes when the reason codes occur such that the performance of the process can be analyzed and updated periodically over different time periods or analyzed in real time. The I/O interface 150 can also be connected to a local area network (LAN) 196, a wide area network (WAN) 197, and one or more other I/O devices 198 such as scanners, printers, etc.

Figure 3B:
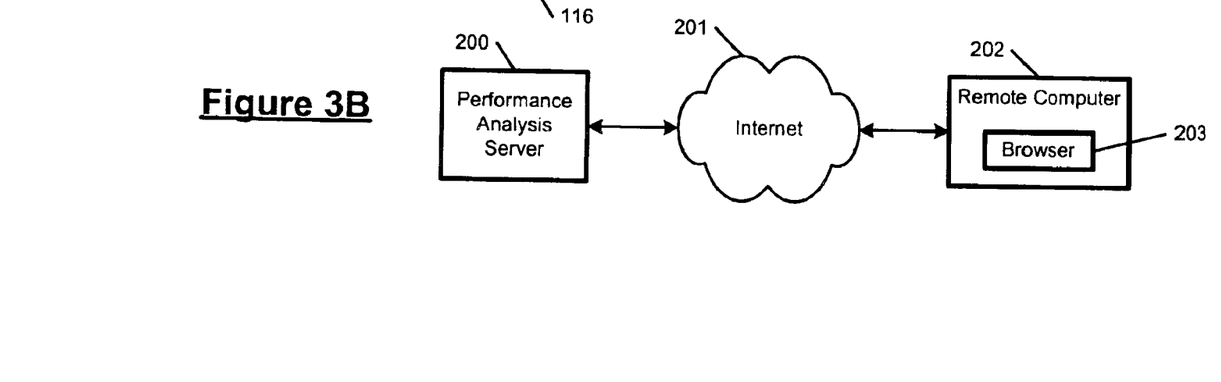
FIG. 3B illustrates a performance analysis server that is connected through the Internet to a browser of a remote computer.

Referring now to FIG. 3B, a performance analysis server 200 is connected to the Internet 201 in any suitable manner such as cable, LAN, WAN, satellites, etc. The performance analysis server 200 is connected to the flowchart-based programming and control system 110 through the LAN 196, the WAN 197, the Internet, radio frequency (RF) or other suitable connections. Alternately, the performance analysis server 200 can be integral with the flowchart-based programming and control system 110. A remote computer 202 includes a browser 203 such as Internet Explorer®, Netscape Navigator® or any other suitable browser. The remote computer 202 remotely accesses performance data, charts and graphs that are generated by the performance analysis module 190. The remote computer 202 is capable of accessing real time data that is related to the process.

Figure 4:
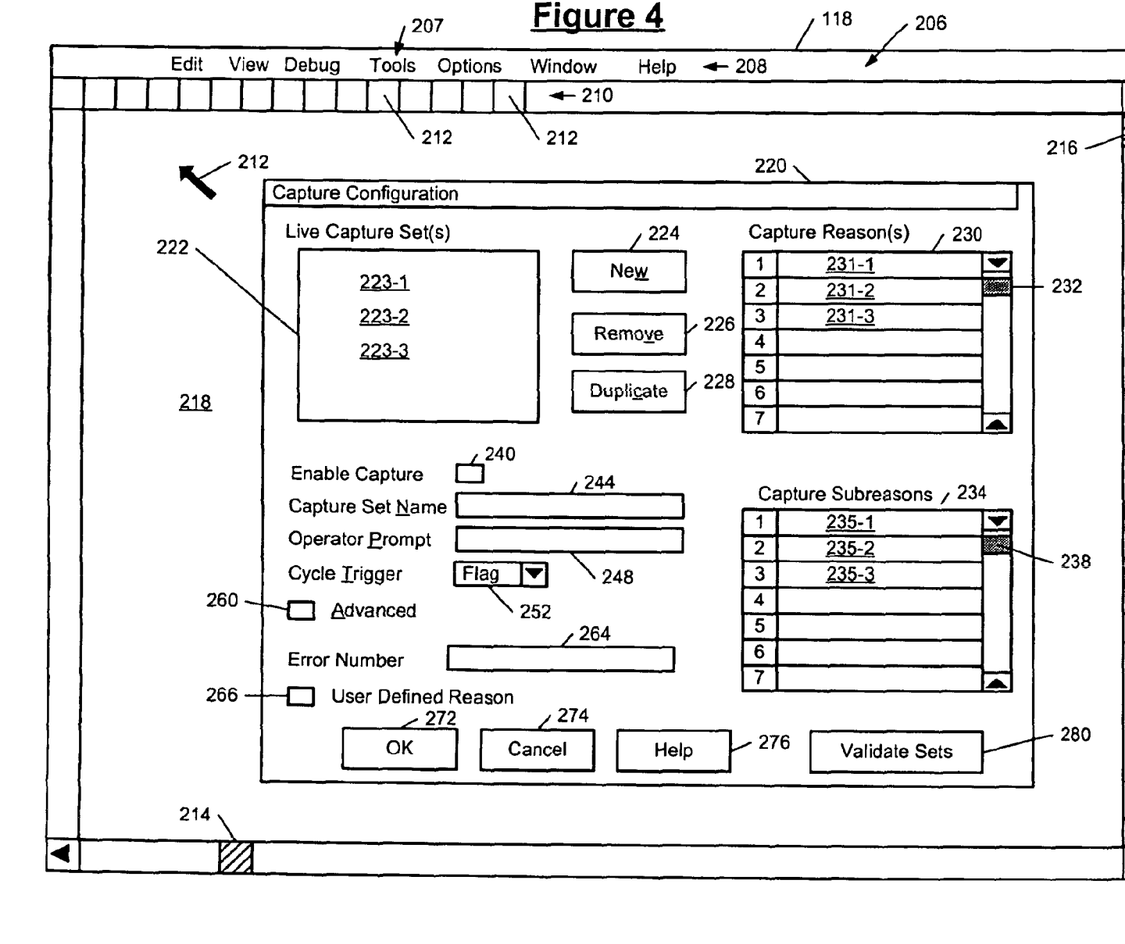
FIG. 4 is a screen view of a capture configuration dialog box for initializing reasons and sub-reasons.

Referring now to FIG. 4, the reason code module 188 is illustrated in further detail. The flowchart module 174 includes a window 206 with a menu bar 207 and one or more drop down menus 208 that are operated in a traditional point-and-click manner. A tool bar 210 includes one or more tools 212 that perform various functions in the flowchart module 174. Horizontal and vertical scroll bars 214 and 216 allow a user to scroll a page 218. A capture configuration dialog box 220 allows capture sets to be initialized and configured. The capture configuration dialog box 220 includes a list box 222 that lists existing capture sets. Command button 224 allows new capture sets to be added. Command button 226 allows existing capture sets to be removed and command button 228 allows an existing capture set to be duplicated under a new name. Skilled artisans can appreciate that the dialog boxes and GUIs can be modified in various ways while still achieving the described functionality.

Once a capture set is selected and/or named, capture reasons 231-1, 231-2, 231-3, . . . can be added to a list box 230 that includes a vertical scroll bar 232 for scrolling through capture reasons. For each capture reason, one or more capture sub-reasons 235-1, 235-2, 235-3, . . . can be added to a list box 234 that also includes a vertical scroll bar 238 for scrolling through capture sub-reasons. A check box 240 allows a capture set to be enabled and disabled for use. The enable check box 240 allows a user to enable and disable capture sets without needing to delete the capture sets. Capture sets that are disabled are not available in a capture expression dialog box.

A text box 244 allows a capture set to be named. An operator prompt text box 248 allows input of text to be displayed to an operator when a flowchart block associated with the operator prompt is encountered during use. A cycle trigger drop down list box 252 includes cycle triggers such as input, output or flag. A check box 260 allows an advanced mode to be selected. When selected, the advanced check box 260 enables sub-reasons to be entered in addition to other functions that will be described below.

An error number text box 264 allows an error number to be entered. An error number can be assigned to a reason/sub-reason combination. The flowchart module 174 tracks errors that occur using a global data item. When the reason/sub-reason occurs, the user can check the error number to see if the error occurred. The error number function is enabled when the advanced check box 260 is selected.

A check box 266 allows a user-defined reason to be enabled. User-defined reasons are enabled when the advanced check box 260 is selected. User-defined reasons can be employed with legacy programmable logic controllers (PLC) that support the ability to share data with another computer. The legacy PLC includes an internal status item for errors that are associated with the legacy PLC. The flowchart module 174 assigns a tag that is connected to a data table of the legacy PLC. The tag represents a user-defined reason. In this approach, no flowchart blocks are required to capture the user-defined reason.

When flowchart source code already contains error numbers that are assigned for downtime, the user need not assign reason/sub-reason codes to a flowchart block. The user, however, may wish to have the error numbers represented by a readable string. The user adds a flowchart that converts the error number to a string. Whenever a user-defined reason changes state, the value is recorded as the reason for the error.

A command box 272 allows a user to approve the current capture configuration. A cancel box 274 cancels changes made to the current capture set. A command box 276 triggers an on-line help dialog box. A command box 280 validates capture sets.

Figure 5:
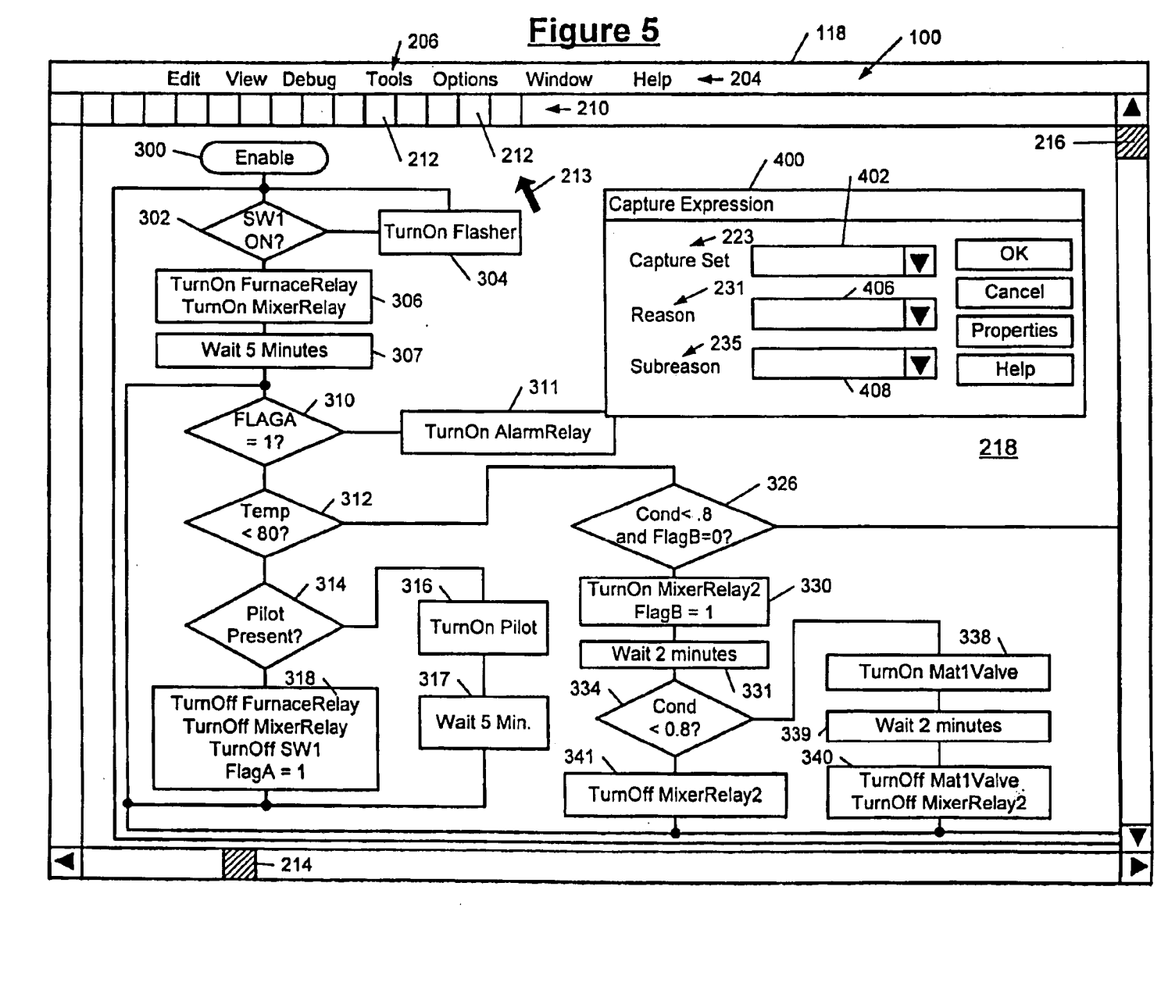
FIG. 5 is a screen view of an exemplary flowchart that is generated by the flowchart-based programming and control system and a capture expression dialog box for assigning reasons and sub-reasons to blocks within the flowchart.

Referring now to FIG. 5, the flowchart 176 is illustrated in further detail and includes enable blocks, decision blocks, and action blocks. Control begins at enable block 300 where variables are initialized. For example, Flag A and Flag B are set equal to zero. Control continues with decision block 302 where control determines whether a first switch is on. If the first switch is not on, control turns on a flasher at action block 304 and control returns to step 302. Otherwise, control continues with action block 306 where control turns on a relay associated with the furnace 60 and a relay associated with the mixer 42. Control waits five minutes at wait block 307 until the furnace 60 is operating and the mixer 42 has had sufficient time to mix the first and second materials. Then, control continues with decision block 310 where control determines whether Flag A is equal to one. If Flag A equals one, control turns on an alarm relay (not shown in FIG. 1) in step 311. Otherwise, control continues with decision block 312 where control determines if the temperature of the first and second materials 41 is less than 80° F. If the temperature is less than 80°, control continues with decision block 314 where control determines whether a pilot is present by scanning an output of the pilot sensor 72.

If the pilot is not present, control turns on the pilot using the ignition device 70, waits five minutes at wait block 317, and then returns to step 310. Otherwise, control continues with action block 318 where control turns off the furnace 60, the mixer 42, and the first switch, sets Flag A equal to 1, and continues with step 310.

If the temperature is greater than 80° F., control continues with decision block 326 where control determines whether the conductivity of the first and second materials 41 is less than 0.8 and a Flag B is equal to zero. If not, control continues with action block 330 where control turns on a relay associated with the second mixer 46, and sets the Flag B equal to one. In wait block 331, control waits 2 minutes. Control continues with decision block 334 where control determines whether the conductivity of the materials 41 is less than 0.8. If it is, control continues with step 338 where control turns on the solenoid valve 20 that is associated with the first material supply 12. Control waits two minutes in wait block 339. Control turns off the solenoid valve 20 and the relay that is associated with the second mixer 46 in action block 340 and continues with step 310. Otherwise, control continues with step 341 where control turns off the relay associated with the mixer 46.

Figure 6:
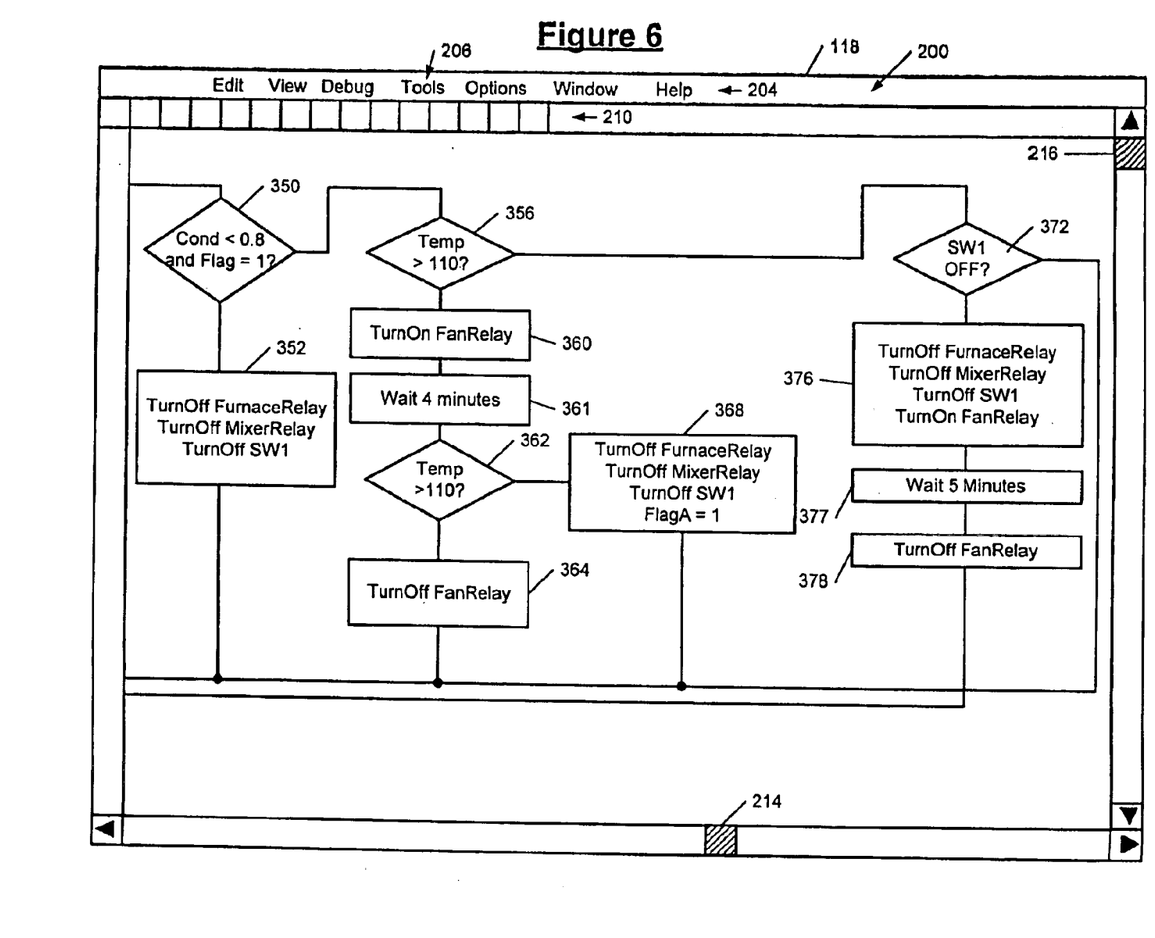
FIG. 6 is a screen view of the flowchart of FIG. 5.

Referring now to FIG. 6, if the conductivity is greater than 0.8 or the flag is equal to zero, control continues from step 326 to step 350 where control determines if the conductivity is less than 0.8 and the flag equals one. If both conditions are met, control continues with step 352 where control shuts down the furnace relay, the mixer relay, and the first switch and continues with step 310. Otherwise, control continues with step 356 where control determines whether the temperature of the first and second materials 41 is greater than 110° F. If the condition is true, control continues with action block 360 where control turns on a fan relay to start the fan 30 to cool the first and second materials 41 and waits four minutes in wait block 361.

Control continues with decision block 362 where control determines whether the temperature still exceeds 110° F. If not, control turns off the fan relay associated with the fan 30 and continues with step 310. Otherwise, control continues with step 368, where control turns off the furnace relay, the mixer relay, and the first switch, sets Flag A equal to one, and continues with step 310. If the temperature does not exceed 110° F. in step 356, control continues with decision block 372 where control determines whether the first switch is off. If it is, control continues with action block 376 where control turns off the furnace relay and the mixer relay. Control turns on the fan relay associated with the fan 30. Control waits five minutes in wait block 377. Control turns off the fan relay in action block 378 and continues with step 302. Otherwise, control continues with step 310.

Referring back to FIG. 5, a tool 212 on the tool bar 210 allows the user to select a special action block that generates reason and sub-reason codes when it is executed at run time. The tool bar adds the special action block to the page 218. When the user double clicks on the special action block tool, a dialog box 400 is generated which allows a previously defined capture set 223 to be selected from a drop down list bow 402. Once a capture set is selected, reason codes 231 and sub-reason codes 235 are enabled and can be selected from drop down list boxes 406 and 408.

In the exemplary flowchart illustrated in FIG. 5, the user assigns a capture expression to block 306. The user assigns the reason "up time" to the process by the action block 306 to indicate that the system is operational. The user similarly assigns the reason code "furnace down" and the sub-reason code "shut down" to the process by the action block 318. The user assigns the reason code "furnace down" and the sub-reason code "pilot" to the process by the action block 316. The user assigns "conductivity" and the sub-reason code "general" to the process by the action block 330. The user assigns the reason code "conductivity" and the sub-reason code "add first material" to the process by the action block 338.

Referring to FIG. 6, the user assigns the reason code "conductivity" and the sub-reason code "shut down" to the process by the action block 352. The user assigns the reason code "temperature" and the sub-reason code "general" to the process by the action block 360. The user assigns the reason code "temperature" and the sub-reason code "shut down" to the process by the action block 368. Finally, the user assigns the reason code "operator shut down" to the process by the action block 376.

The flowchart object code 180 is executed by the flowchart run time engine 186. As the special action blocks that are associated with reason and/or sub-reason codes are encountered, the reason codes are generated and output to the performance analysis module 190. The performance analysis module 190 records the occurrence of the reason code and the time that the reason code occurred.

Figure 7:
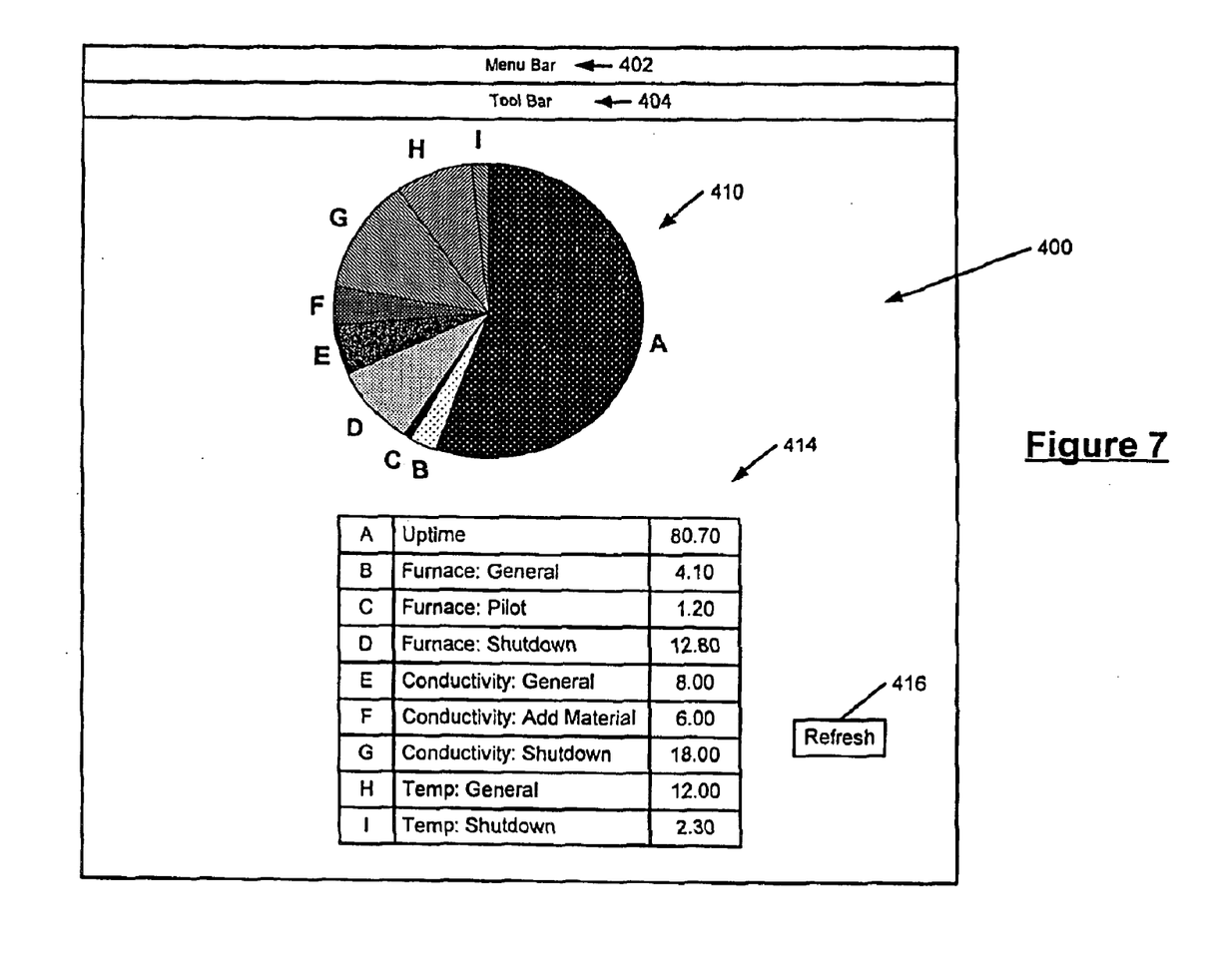
FIG. 7 is a screen view of a chart module for illustrating downtime and cycle time for the exemplary process illustrated in FIG. 1.

Referring now to FIG. 7, a charting module 400 that is associated with the performance analysis module allows a user to analyze the stored data with reason codes to analyze downtime and cycle time of the process 10. The charting module 194 includes a menu bar 402 and a tool bar 404 which allow a user to interface with stored reason codes to generate a graphical representation 410 of the performance of the process the graphical representation may be a pie chart, bar graph, or other suitable chart or visual representation. A text-based representation may also be generated at 414. A refresh command button 416 refreshes the data.

As can be appreciated, the flowchart-based programming and control system according to the present invention allows supervisors, engineers and managers to dramatically improve the accuracy of the information about the operation of a process that is to be controlled. By providing real time information the operation of the process can be optimized more readily. Furthermore, the need to generate custom logic to capture the reason and sub-reason codes is no longer necessary.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A flowchart-based programming and control system, comprising:
   a computer that includes a processor, memory, and a display;
   a device that is connected to said computer and that is associated with a process;
   a flowcharting module that is executed by said computer and that generates and edits flowchart source code that includes flowchart blocks and that contains logic for operating said device to further said process, wherein first and second flowchart blocks identify first and second operational statuses of said process; and
   a reason code module that is associated with said flowcharting module and that assigns first and second reason codes to said first and second flowchart blocks to automatically detect relative frequencies at which said first and second operational statuses occur during a time period.

2. The flowchart-based programming and control system of claim 1 wherein said flowcharting module compiles said flowchart source code into flowchart object code.

3. The flowchart-based programming and control system of claim 2 further comprising:
   a flowchart run time engine module that is associated with said computer for executing said flowchart object code to control said process.

4. The flowchart-based programming and control system of claim 3 wherein said flowchart object code generates said first reason code during execution of said first flowchart block in said flowchart object code.

5. The flowchart-based programming and control system of claim 4 wherein said flowchart object code generates said second reason code during execution of said second flowchart block in said flowchart object code.

6. The flowchart-based programming and control system of claim 5 further comprising:
   a performance analysis module that is executed by said computer and that records when said first and second reason codes occur.

7. The flowchart-based programming and control system of claim 6 further comprising:
   a charting module that is executed by said computer and associated with said performance analysis module and that graphically represents data recorded by said performance analysis module.

8. The flowchart-based programming and control system of claim 1 wherein said reason code module allows a user to assign a sub-reason code.

9. The flowchart-based programming and control system of claim 1 wherein said first and second flowchart blocks are action blocks.

10. The flowchart-based programming and control system of claim 7 further comprising:
    a performance analysis server that is connected to a distributed communications system and that that allows a remote computer to access said data.

11. A flowchart-based programming and control system comprising:
    a computer that includes a processor, memory and a display;
    a device that communicates with said computer and that is associated with a process;
    a flowcharting module that is executed by said computer and that generates and edits flowchart source code that includes flowchart blocks and that contains logic for operating said device to further said process, wherein first and second flowchart blocks identify first and second operational statuses of said process, and wherein said flowcharting module compiles said flowchart source code into flowchart object code;
    a reason code module that is associated with said flowcharting module and that assigns first and second reason codes to said first and second flowchart blocks to automatically detect relative frequencies at which said first and second operational statuses occur during a time period; and
    a flowchart run time engine module that is associated with said computer for executing said flowchart object code to control said process, wherein said flowchart object code generates said first reason code during execution of said first flowchart block in said flowchart object code.

12. The flowchart-based programming and control system of claim 11 wherein said flowchart object code generates said second reason code during execution of said second flowchart block in said flowchart object code.

13. The flowchart-based programming and control system of claim 12 further comprising:
    a performance analysis module that is executed by said computer and that records when said first and second reason codes occur.

14. The flowchart-based programming and control system of claim 13 further comprising:

a charting module that is executed by said computer and associated with said performance analysis module and that graphically represents data recorded by said performance analysis module.

15. A method for analyzing the performance of a process comprising the steps of:

generating flow chart source code using a flowcharting program on a computer;

connecting a device that is associated with a process to said computer;

adding flowchart blocks to said flowchart source code that contain logic for operating said device to further said process, wherein first and second flowchart blocks identify first and second operational statuses of said process; and assigning first and second reason codes to said first and second flowchart blocks in said flowchart source code to automatically detect relative frequencies at which said first and second operational statuses occur during a time period.

16. The method of claim 15 further comprising the step of:

compiling said flowchart source code and generating flowchart object code.

17. The method of claim 16 further comprising the step of:

executing said flowchart object code to control said process.

18. The method of claim 17 further comprising the step of:

generating said first reason code during execution of said first flowchart block in said flowchart object code.

19. The method of claim 18 further comprising the step of:

generating said second reason code during execution of said second flowchart block in said flowchart object code.

20. The method of claim 19 further comprising the step of:

recording when said first and second reason codes occur.

21. The method of claim 20 further comprising the step of:

graphically representing data that is recorded during said recording step.

\* \* \* \* \*